(12) United States Patent
Winslow et al.

(10) Patent No.: US 10,728,019 B2
(45) Date of Patent: Jul. 28, 2020

(54) COMMUNICATION NODES, DISTRIBUTED COMMUNICATION NETWORKS, AND METHODS FOR MONITORING COMMUNICATION IN A COMMUNICATION NETWORK USING BLOCKCHAINS

(71) Applicant: Gulfstream Aerospace Corporation, Savannah, GA (US)

(72) Inventors: Matthew Winslow, Savannah, GA (US); Scott Bohanan, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 272 days.

(21) Appl. No.: 15/965,218

(22) Filed: Apr. 27, 2018

(65) Prior Publication Data

US 2019/0334697 A1  Oct. 31, 2019

(51) Int. Cl.
| | | |
|---|---|---|
| *H04L 29/06* | (2006.01) | |
| *H04L 9/06* | (2006.01) | |
| *H04L 9/32* | (2006.01) | |
| *H04L 9/08* | (2006.01) | |

(52) U.S. Cl.
CPC .......... *H04L 9/0637* (2013.01); *H04L 9/0618* (2013.01); *H04L 9/0643* (2013.01); *H04L 9/0819* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 2018/0343114 A1* | 11/2018 | Ben-Ari | H04L 9/0825 |
| 2019/0281026 A1* | 9/2019 | Mitchell | H04W 4/42 |
| 2019/0303834 A1* | 10/2019 | Paul | G06Q 10/06395 |

* cited by examiner

*Primary Examiner* — Andrew J Steinle
(74) *Attorney, Agent, or Firm* — LKGlobal (57) ABSTRACT

A communication node for use in a distributed communication network, a communication network and a method for monitoring communication and cybersecurity in a distributed communication network are provided. The communication node includes, but is not limited to a communication module, a memory, and a processor. The communication module is configured to communicate with a communication module of another communication node in a distributed communication network and to store a local copy of a blockchain ledger in the memory. The processor is further configured to generate a record to be added to the local copy of the blockchain ledger stored in the memory every time the communication node communicates with any of the plurality of communication nodes in the distributed communication network. The processor is further configured to verify and monitor the permissioned blockchain by consensus computing and previous hash comparisons.

20 Claims, 3 Drawing Sheets

COMMUNICATION NODES, DISTRIBUTED COMMUNICATION NETWORKS, AND METHODS FOR MONITORING COMMUNICATION IN A COMMUNICATION NETWORK USING BLOCKCHAINS

TECHNICAL FIELD

Embodiments of the present invention generally relate to communication nodes, and more particularly to communication networks and methods for monitoring communication and cybersecurity in a communication network.

BACKGROUND OF THE INVENTION

Wireless aircraft communication networks including so called "line replaceable units" (LRUs) and sensors communicating by a distributed peer-to-peer (p2p) network should have robust security features. Thus, there is need for a system that ensures cybersecurity in a communication network by monitoring the health and data integrity of the communication network.

In conventional communication networks, a central server is used as a control and monitoring instance. In case such a central server is corrupted, the cybersecurity of a respective communication network is threatened.

It is desirable to ensure cybersecurity in communication networks. It is further desirable to monitor the health and data integrity of a communication network. Furthermore, other desirable features and characteristics of the present invention will become apparent from the subsequent detailed description and the appended claims, taken in conjunction with the accompanying drawings and the foregoing technical field and background.

SUMMARY

The disclosed embodiments relate to a communication node for use in a distributed communication network, particularly for use in an aircraft, such as an airplane, for example. In a first non-limiting embodiment, the communication node includes, but is not limited to a communication module, a memory, and a processor. The communication module is configured to communicate with a communication module of another communication node of a plurality of communication nodes in a distributed communication network. The processor is configured to store a local copy of a blockchain ledger of a permissioned blockchain in the memory. The processor is further configured to generate a record to be added to the local copy of the blockchain ledger stored in the memory every time the communication node communicates with any of the plurality of communication nodes in the distributed communication network. The processor is further configured to verify and monitor the permissioned blockchain by consensus computing and previous hash comparisons.

According to an aspect, disclosed embodiments relate to a distributed communication network. In a second non-limiting embodiment, the communication network includes, but is not limited to a plurality of communication nodes. Each communication node of the plurality of communication nodes includes, but is not limited to a communication module, a memory, and a processor. The communication module is configured to communicate with a communication module of another communication node of a plurality of communication nodes in the distributed communication network. The processor is configured to store a local copy of a blockchain ledger of a permissioned blockchain in the memory. The processor is further configured to generate a record to be added to the local copy of the blockchain ledger stored in the memory every time the communication node communicates with any of the plurality of communication nodes in the distributed communication network. The processor is further configured to verify and monitor the permissioned blockchain by consensus computing and previous hash comparisons.

According to a further aspect, disclosed embodiments relate to a method for monitoring communication in a distributed communication network. In a third non-limiting embodiment, a method includes but is not limited to storing, by a processor of a communication node of the distributed communication network, a local copy of a blockchain ledger of a permissioned blockchain in a memory of the communication node. The method further includes, but is not limited to generating, by the processor, a record to be added to the local copy of the blockchain ledger stored in the memory every time the communication node communicates with any of the plurality of communication nodes in the distributed communication network. And the method further includes, but is not limited to verifying and monitoring, by the processor, the permissioned blockchain by consensus computing and previous hash comparisons.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following description.

Some of the disclosed embodiments relate to communication nodes for use in a communication network of an aircraft. The aircraft may be an airplane or a helicopter, for example. In one exemplary implementation that will be described below with reference to FIGS. 1-6, the aircraft is an airplane. However, it should be appreciated that the disclosed embodiments can be implemented within any other type of aircraft.

In accordance with the disclosed embodiments, a communication node is a device, such as a computer or any other communication device that is configured to communicate with other communication nodes in a communication network.

In an example, a communication node is an LRU or a sensor of an aircraft.

In accordance with the disclosed embodiments, a blockchain is a dataset comprising blocked information.

One or more embodiments of the present disclosure relate to a communication network comprising numerous communication nodes and methods for monitoring communication and cybersecurity in a communication network using blockchain technology.

According to an embodiment, the blockchain may be implemented according to blockchains known in the field of cryptocurrencies. However, in contrast to cryptocurrencies, each block of the blockchain according to the present disclosure comprises information about a communication activity of a communication node in the communication network the blockchain is used for. This means that communication activity, such as a protocol of messages transmitted to and/or from the communication node is included in the blockchain used in the communication network.

To ensure cybersecurity when adding a block to the blockchain, a first hash-value and a second hash-value may be written in a header of the block to be added to the blockchain. The first hash-value may be calculated from new information contained in the block to be added. The second hash-value may be calculated from all information of the previous blocks of the blockchain.

According to an embodiment, a processor of a communication node may be configured to verify and monitor the permissioned blockchain by consensus computing and previous hash comparisons. This means that a blockchain ledger, which is stored in a memory of a communication node, and which has been changed by adding a new block, may be transmitted to other communication nodes in the communication network. The other communication nodes may be configured to compare the second hash-value written in the header of the new block to be added with a reference hash value of all information of a blockchain ledger stored in their memory.

Thus, when the second hash-value and the reference hash-value are identical, only the new block comprises new information. Respectively, the blockchain ledger as such is unchanged and therefore secure. In case the second hash-value and the reference hash-value are not identical, the blockchain ledger has been changed and, therefore, is not secure anymore.

According to an embodiment, the processor of the communication node may be configured to add the new block to the local copy of the blockchain ledger stored in the memory only in case the communication node receives a positive verification for the new block from a number of trusted communication nodes in the distributed communication network. This means the blockchain ledger stored in the memory is only changed when it has been considered as valid, i.e. as secure, by the communication network.

In other words, information, such as a protocol of data transmitted from a first communication node to a second communication node may only be added to a blockchain by adding the information in a block to a blockchain ledger stored in a memory of the communication node. However, the blockchain ledger can only be changed when a hash-value of the blockchain ledger stored in the memory of the communication node has been considered as valid by comparing the blockchain ledger to other blockchain ledgers stored in the memories of other communication nodes in the communication network.

In the context of the present disclosure, consensus computing is a technique which is based on an exchange of information in a blockchain between numerous, preferably all communication nodes of a communication network, so that at least a majority of the communication nodes agree (consensus) that the information in the blockchain is valid. Once the majority of communication nodes in the communication network, preferably all communication nodes in the communication network have agreed to the information in the blockchain, the blockchain is updated and sent to every communication node of the communication network to be stored there for further comparisons with further information to be validated. Thus, information in the blockchain cannot be changed or altered unless a majority of the nodes agree on the change.

The present disclosure is based on a decentralized validation of information by numerous, preferably all (trusted) communication nodes of a communication network.

In the context of the present disclosure, a hash comparison is a comparison of hash-values, such as hash-values calculated for information contained in a blockchain ledger stored in a memory of a communication node. The comparison may be calculated as a differential value, for example.

According to an embodiment, the processor may be configured to discard information to be added to the local copy of the blockchain ledger stored in the memory, in case the hash comparison of the second hash-value of all previous blocks written in the header of the block transmitted from the sender communication node with the reference hash-value of all previous blocks of the local copy of the blockchain ledger stored in the memory of the communication node is false, i.e. invalid. This means that information will only be added to the blockchain when the previous blockchain used to be combined with the information is considered valid by the communication network.

According to another embodiment, the processor may be configured to exclude a sender communication node from the distributed communication network for further communication with the communication node in case the hash comparison of the second hash-value of all previous blocks written in the header of the block transmitted from the sender communication node with the reference hash-value of all previous blocks of the local copy of the blockchain ledger stored in the memory of the communication node is false.

An exclusion of a communication node sending information that has been considered as invalid by the communication network guarantees cybersecurity. Further, an analysis of communication nodes that has been considered invalid may be used to monitor health and data integrity of the communication network.

According to an embodiment, the processor may be configured to transmit a message to all other communication nodes of the distributed communication network comprising a command that configures the other communication nodes to exclude the sender node from the distributed communication network, in case the hash comparison of the second hash-value of all previous blocks written in the header of the block transmitted from the sender communication node with the reference hash-value of all previous blocks of the local copy of the blockchain ledger stored in the memory of the communication node is false.

To avoid the use of corrupt data in the communication network, a communication that considers information sent from another communication node invalid, will send a warning message to all communication nodes in the communication network. The warning message may include a command that configures the receiving communication nodes to exclude the communication node that sent the corrupt data from further communication. Thus, the communication network will dynamically protect itself from corrupt communication nodes.

According to an embodiment, the first hash-value of the new block and/or the second hash-value of all previous blocks of the local copy of the blockchain ledger is calculated using one or more of the following hash-functions: Public Key Infrastructure (PKI), Merkle Tree, nonce, SHA-256, and other common blockchain and cryptographic techniques.

According to another embodiment, the processor is configured to recognize a candidate communication node of the distributed communication network as a trusted communication node in case the candidate communication node transmits a cryptographic key to the communication node that matches a cryptographic key stored in the memory of the communication node.

To ensure that only secure communication nodes are used for validating information transmitted between communication nodes in the communication network, the communication nodes used for the consensus computing and the hash comparisons may be enrolled using a cryptographic procedure. This means that a new communication node to be enrolled in a communication network must provide a first cryptographic key that will be compared to a second cryptographic key by a trusted communication node in the communication network.

According to another embodiment, the processor may be configured to verify a key exchange of the cryptographic key transmitted by the candidate communication node and the cryptographic key stored in the memory of the communication node only when a user provides an authorization command.

An authorization command provided by a user may be used to ensure that a communication node to be enrolled in a communication network is authorized by the user.

According to an example, a distributed communication network comprises a number of trusted communication nodes. A trusted communication node from the number of trusted communication nodes is configured to verify a candidate communication node based on a cryptographic key transmitted by the candidate communication node and a cryptographic key stored in a memory of the trusted communication node. Further, the trusted communication nodes are configured to validate the new communication node only in case a user provides an authorization command.

According to an example, the key exchange may be a software key exchange between known or trusted nodes in a communication network, which may be used for normal communication.

According to another example, the key exchange may be a hardware key exchange, wherein a hardware key encryption is used when a user is trying to communicate with a communication network with an external candidate device such as a maintenance laptop or tablet. In this example, a communication node of the communication network is configured to transmit a message to the external device that asks for a serial number of the external candidate device. Based on the serial number of the external candidate device, the communication node generates a crypto key that is unique to that serial number. Further, the communication node is configured to use the crypto key that is based on the serial number of the external candidate device for a matching procedure with a set of trusted keys stored in the communication network. If the crypto key that is based on the serial number of the external candidate device matches one of the trusted keys stored in the communication network, the external candidate device will be connected to the network for maintenance or dataloading, for example.

According to another example, a crypto key that is based on the serial number of the external candidate device may be used to connect the external candidate device only for a set of predetermined functions, such as for downloading information but not for uploading information, for example. The predetermined functions may vary with respect to the serial number of the external candidate device.

A greater understanding of the system described above may be obtained through a review of the illustrations accompanying this application together with a review of the detailed description that follows.

Figure 1:
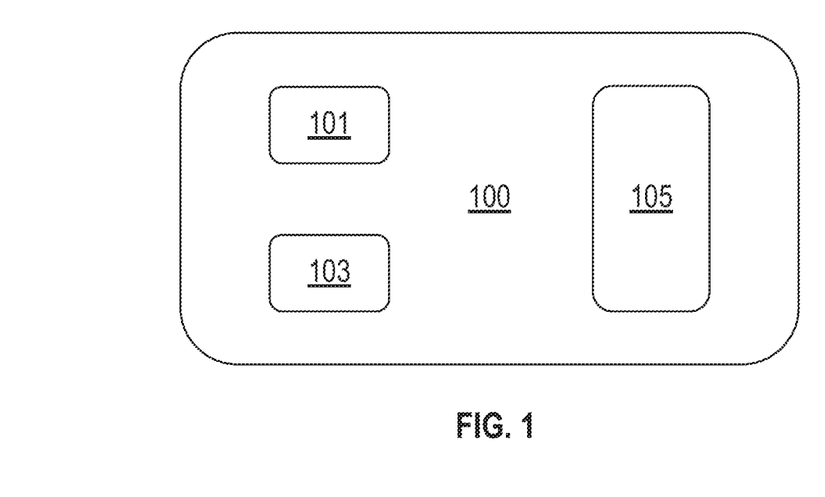
FIG. 1 is a schematic view illustrating a communication node for use in a communication network in accordance with one non-limiting implementation of the disclosed embodiments.

In FIG. 1 a communication node 100 is shown. Communication node 100 comprises a communication module 101, a memory 103 and a processor 105.

The processor 105 can be implemented via a microprocessor-based controller. The processor 105 performs the computation and control functions of the communication node 100. As used herein, a "processor unit" or "processor" can refer to any type of conventional processor, controller, microcontroller, field programmable gate array (FPGA), digital signal processor (DSP) or state machine. A processor can be implemented using a single processor or multiple processors that are not part of a single unit. Further, a processor may comprise single integrated circuits such as a microprocessor, or any suitable number of multiple processors or integrated circuit devices and/or circuit boards working in cooperation to accomplish the functions of a processor. Thus, a processor is not necessarily implemented as a single discrete unit in all embodiments, but may also be implemented using a plurality of said processors that are distributed throughout the node. It should be understood that the processor 105 may comprise a single type of memory component, or it may be linked with a memory 103 composed of many different types of memory components. This memory 103 can include non-volatile memory (such as ROM, flash memory, etc.), memory (such as RAM), or some combination of the two. The RAM can be any type of suitable random access memory including the various types of dynamic random access memory (DRAM) such as SDRAM, the various types of static RAM (SRAM). The RAM may include an operating system, and executable code for power control programs and data conversion programs that can be loaded and executed at the processor to convert or translate data received by the processor 105.

A local copy of a blockchain ledger may be stored in memory 103. This means that memory 103 contains a dataset comprising a number of blocks of a blockchain distributed in a communication network comprising the communication node 100.

Processor 105 is configured to communicate with a communication module of another communication node of a plurality of communication nodes in a distributed communication network using communication module 101.

Figure 2:
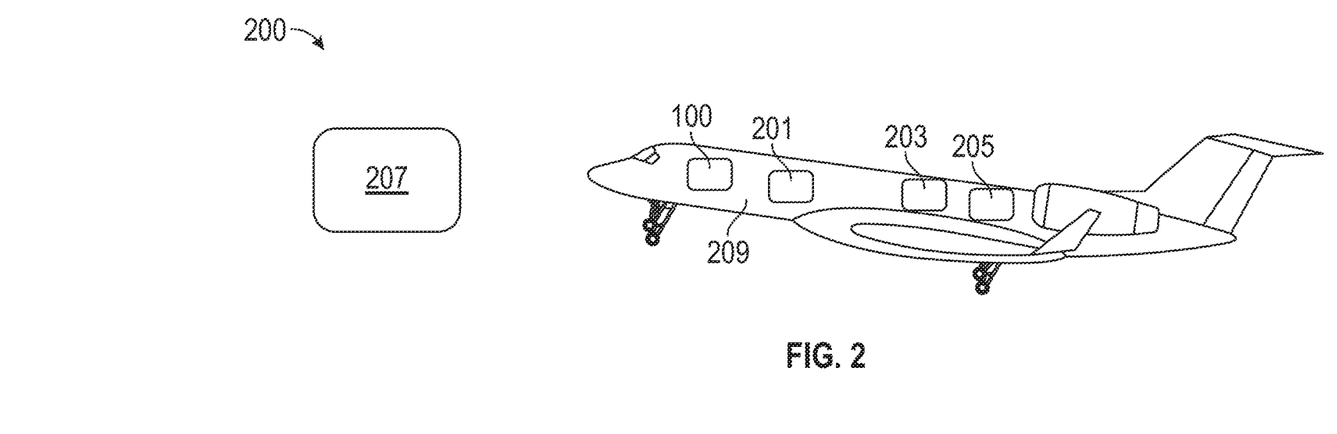
FIG. 2 is a schematic view illustrating a communication network in accordance with a further non-limiting implementation of the disclosed embodiments.

In FIG. 2 a communication network 200 is shown.

Communication network 200 comprises communication node 100, as shown in FIG. 1 and additional communication nodes 201, 203, 205 and 207.

Communication node 100 is a LRU in an aircraft 209, for example.

Communication nodes 201, 203 and 205 are also included in aircraft 209, for example.

Communication node 207 is a cloud-server in communication with the aircraft 209, for example.

All communication nodes 201, 203, 205 and 207 of the communication network 200 have a local copy of the blockchain ledger stored in their memories.

The communication network 200 may contain trusted nodes, such as communication node 100 and communication node 201, for example. The trusted communication nodes are configured to transmit and receive data to monitor cybersecurity and data integrity after being verified and added to the communication network 200.

According to an embodiment, information about each transmission to and/or from the communication node 100 may be written in a block to be added to a blockchain and subsequently added to the blockchain used to monitor cybersecurity and data integrity in communication network 200. Thus, a block comprising the information may be added to the blockchain ledger stored in the memory 103 to include information about communication activity of the communication node 100 in the blockchain used in communication network 200.

For adding a block to the blockchain used in communication network 200, the block may be added to a blockchain ledger stored in the memory 103 of communication node 100 and, together with a copy of the blockchain ledger, transmitted to another communication node 201, 203, 205 or 207 of the communication network 200.

The copy of the local blockchain ledger transmitted from communication node 100 to the other communication nodes 201, 203, 205 or 207 comprises a hash-value that may be calculated for all information contained in the blockchain ledger before adding the block. For validation of the blockchain ledger transmitted from the communication node 100, a validation method may be carried out as described with respect to FIG. 3.

Figure 3:
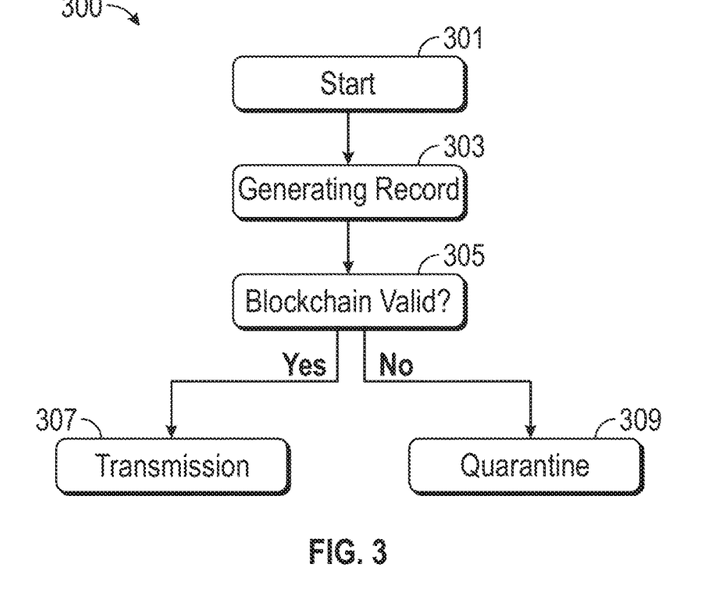
FIG. 3 is a flow chart illustrating an exemplary method for monitoring communication and cybersecurity in a distributed communication network in accordance with one non-limiting implementation of the disclosed embodiments.

In FIG. 3, an exemplary method 300 for monitoring communication and cybersecurity in a distributed communication network is shown.

In starting step 301, a processor of a communication node of a communication network stores a local copy of a blockchain ledger is a memory of the communication node.

In a communication step 303, the processor generates a record of a message to be sent to another communication node in the communication network and adds the record to the local copy of the blockchain ledger.

In a validation step 305, the processor transmits the local copy of the blockchain ledger containing the record to a number of trusted nodes in the communication network. Each of the trusted nodes calculates a hash comparison between a hash-value of the blockchain ledger transmitted from the communication node and a hash-value of a local copy of a blockchain ledger stored in their memories.

Figure 5:
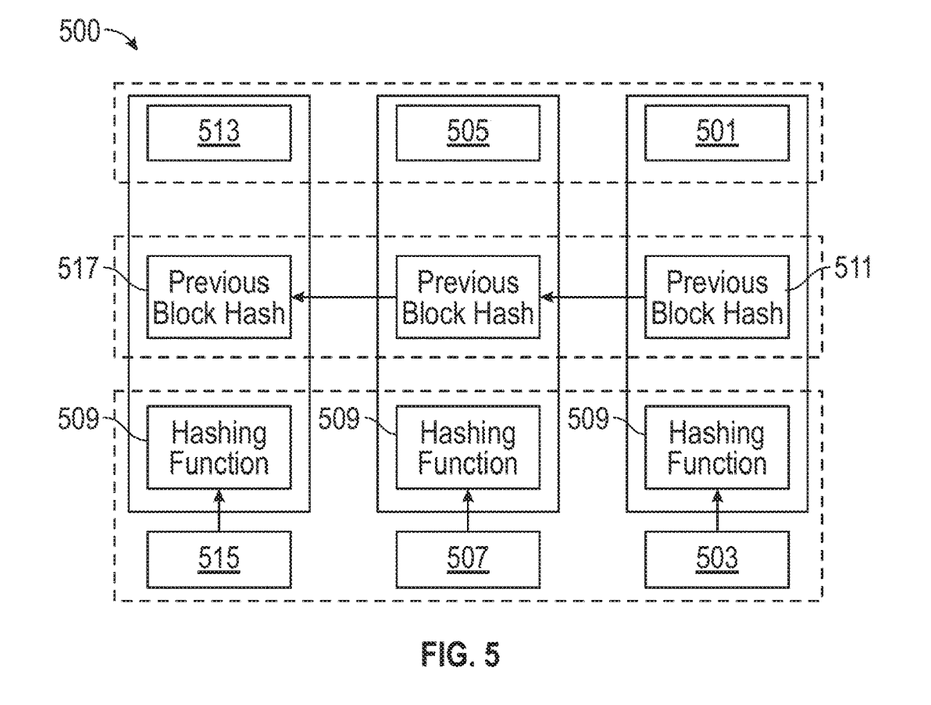
FIG. 5 is an overview of a blockchain for monitoring communication and cybersecurity in a distributed communication network in accordance with a further non-limiting implementation of the disclosed embodiments.

In case a majority, preferably all of the trusted nodes consider the blockchain ledger transmitted by the communication node as valid using consensus computing, as described with respect to FIG. 5, the method continues with transmission step 307 and the message to be sent by the communication node is accepted by a target communication node. In other words, when the hash comparison between the hash-value of the blockchain ledger transmitted from the communication node and the hash-value of a local copy of a blockchain ledger stored in their memories shows a difference, the blockchain ledger transmitted from the communication node is considered invalid.

In case a majority, preferably all of the trusted nodes consider the blockchain ledger transmitted by the communication node invalid, the method continues with quarantine step 309 and the message to be sent by the communication node may be discarded. Additionally, the communication node sending the message may be isolated from the communication network.

According to an embodiment, a number of blockchains that have been considered as valid and/or a number of blockchains that have been considered as invalid may be used to monitor the health and data integrity of the communication network. Thus, statistics maybe computed to monitor the health and data integrity of the communication network. Respectively, the statistics may be sent to other devices and systems for further analysis and alerting. The other devices may be part of an aircraft, such as an airplane or local devices, such as servers, for example.

According to another embodiment, a status of the blockchain can be used in a cloud operation where a user, such as a manufacturer of an aircraft, can access its contents. The contents can be placed in a relational database where the user can monitor the health and data integrity of communication nodes of a communication network and provide trending operations (predictive calculations) of an aircraft or a fleet in which the communication network is used. The health and data integrity monitoring can also be used on all aircrafts of a fleet of a manufacturer, for example, where every aircraft acts as a node of a larger blockchain. This may be used to provide a total fleet view of aircraft health.

According to another embodiment, a communication node, such as an LRU, may be included in a communication network that is configured to monitor a current state of a blockchain used in the communication network. The communication node may be real-time trending data or may send data to a control instance such as a manufacturer of an airplane the communication node is operated in. The data to be sent may be data contained in the blockchain. Thus, the blockchain may be used a large database of all the records from each node. This data can be used for health monitoring and trending.

According to an example, the communication node may be configured to send data to the control instance if certain events occur.

Figure 4:
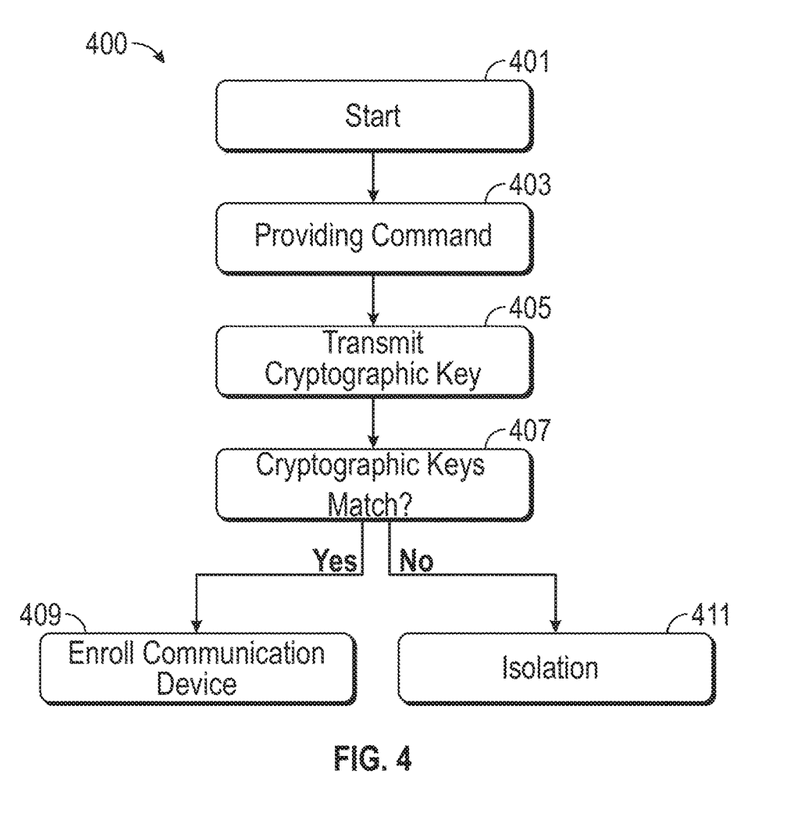
FIG. 4 is a flow chart illustrating an exemplary method for monitoring communication and cybersecurity in a distributed communication network in accordance with a further non-limiting implementation of the disclosed embodiments.

To enroll a communication device as a trusted communication node in a communication network, an embedding procedure as described with respect to FIG. 4 may be used.

In FIG. 4, an embedding procedure for enrolling a communication device as a trusted node in a communication network, such as communication node 100 shown with respect to FIG. 1, for example, is shown.

The procedure starts with activating the communication device in activation step 401.

To ensure that only a trusted device is embedded as a trusted node, a user provides for a command that activates a time window for exchanging a cryptographic key in input step 403.

In response to the command provided in input step 403, the communication device transmits a cryptographic key to a trusted device in the communication network in transmission step 405.

The trusted device receiving the cryptographic key compares the cryptographic key received from the communication device with a cryptographic key stored in a memory of the trusted device in comparison step 407.

In case the cryptographic key received from the communication device matches the cryptographic key stored in the memory of the trusted device, the communication device is enrolled in the communication network as a trusted device in enrolling step 409. Thus, the communication device may be used to validate messages using a blockchain ledger stored in a memory of the communication device as described with respect to FIGS. 3 and 5.

In case the cryptographic key received from the communication device does not pass the key exchange, i.e. the received key does not match the cryptographic key stored in the memory of the trusted device, the communication device is isolated from the communication network as a trusted device in isolation step 411. Thus, the communication device cannot be used to validate messages using a blockchain ledger stored in a memory of the communication device as described with respect to FIGS. 3 and 5.

In FIG. 5, a blockchain 500 for use in a method as described with respect to FIG. 4 is shown. The blockchain 500 comprises a first block 501 with a first dataset 503 and a second block 505 with a second dataset 507. The first dataset 503 and the second dataset 507 are encrypted using an encryption algorithm that is based on a public key infrastructure and a Merkle tree, for example.

The datasets 503 and 507 may comprise information about a transmission protocol of a communication node in a communication network, for example.

For each block 501, 505 a hash-value of all information included in the blockchain 500 is calculated using a hash-function 509. Thus, a hash-value including dataset 503 is written in the header of the first block 501 and a hash-value including dataset 507 is written in the header of the second block 505.

Additionally, the hash-values of all previous blocks is written in the header of a particular block to ensure data integrity within the blockchain 500. Thus, a hash-value 511 of all previous blocks of the first block 501 is written in the header of the first block 501. By comparing the hash-value of all previous blocks with the hash-values of local copies of the blockchain 500 stored in other communication nodes, data integrity of the blockchain 500 is assured.

To add a third block 513 comprising a dataset 515 to the blockchain 500, a hash-value 517 of all previous blocks is written in the header of the third block 513. By comparing the hash-value 517 of all previous blocks of the third block 513 with a hash-value of all information of the second block 505 that is part of a local copy of the blockchain 500 stored in another communication node, all information contained in the previous blocks of the third block 513 is validated.

As soon as the information contained in the previous blocks of the third block 513 is considered as valid, i.e. the hash-value 517 of all previous blocks of the third block 513 and the hash-value of all information of the second block 505 of the local copy of blockchain 500 stored the other communication node are considered identical, the blockchain 500 is updated and an updated version of blockchain 500 comprising the third block 513 is sent to all communication nodes of the communication network thereby ensuring that the data stored in second block 505 are valid and a sender of the blockchain 500 is considered as a trusted communication node, for example.

According to an embodiment, a communication node must solve a cryptographic function to prove trustworthiness and data integrity before it is allowed to add data to the blockchain 500.

In case the hash-value 515 of all previous blocks of the third block 513 is not identical with the hash-value of the second block 505 of a local copy of blockchain 500 stored in the other communication node, the whole blockchain is considered as invalid. Thus, data transmitted from a sender of the blockchain considered as invalid will not be accepted by the communication network.

Figure 6:
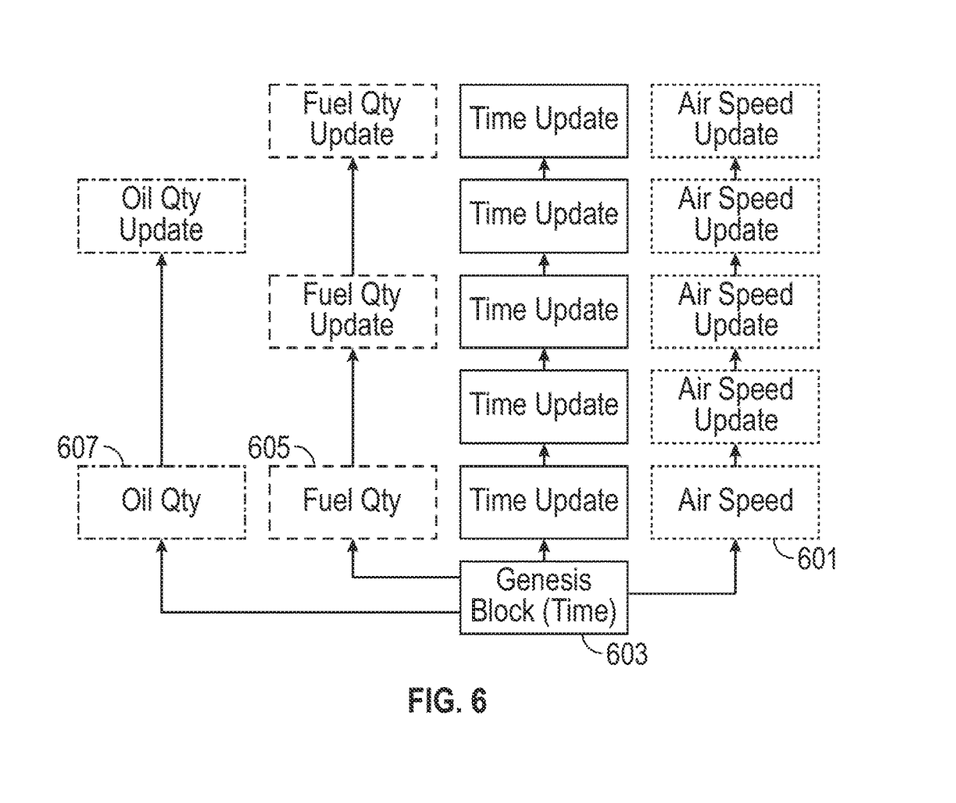
FIG. 6 is an example of a blockchain ledger in accordance with a further non-limiting implementation of the disclosed embodiments.

In FIG. 6, a blockchain ledger 600 is shown. The blockchain ledger 600 comprises records 601, 603, 605 and 607. The records 601 to 607 may be updated on a regular basis based on an updated time interval. The records 601 to 607 may be updated only as new values are coming from a trusted node enrolled as described with respect to FIG. 4.

Further, the records 601 to 607 may be updated only as new values are validated using a blockchain and consensus computing as described with respect to FIGS. 3 and 5.

Those of skill in the art would further appreciate that the various illustrative logical blocks, modules, circuits, described in connection with the embodiments disclosed herein may be implemented as electronic hardware, computer software, or combinations of both. Some of the embodiments and implementations are described above in terms of functional and/or logical block components (or modules). However, it should be appreciated that such block components (or modules) may be realized by any number of hardware, software, and/or firmware components configured to perform the specified functions. To clearly illustrate this interchangeability of hardware and software, various illustrative components, blocks, modules, circuits, have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied directly in hardware, in a software module executed by a processor, or in a combination of the two. A software module may reside in RAM memory, flash memory, USB flash memory stick, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. For example, although the disclosed embodiments are described with reference to a line replaceable unit of an aircraft, those skilled in the art will appreciate that the disclosed embodiments could be implemented in other types of computers that are used in other types of aircrafts. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A communication node for monitoring communication and cybersecurity in a communication network, the communication node comprising:

a communication module;
a memory; and
a processor;
wherein the communication module is configured to communicate with a communication module of another communication node of a plurality of communication nodes in the distributed communication network,
wherein the processor is configured to store a local copy of a blockchain ledger of a permissioned blockchain in the memory,
wherein the processor is configured to generate a record to be added to the local copy of the blockchain ledger stored in the memory every time the communication node communicates with any of the plurality of communication nodes node in the distributed communication network, and
wherein the processor is configured to verify and monitor the permissioned blockchain by consensus computing and previous hash comparisons.

2. The communication node according to claim 1, wherein the processor is configured to compute previous hash comparisons for all messages transmitted to the communication node to insure data integrity in the distributed communication network.

3. The communication node according to claim 2, wherein the processor is configured to compute a first hash-value of a new block with a record to be added to the blockchain ledger stored in the memory and to write the first hash-value of the new block together with a second hash-value of all previous blocks of the blockchain ledger in a header of the new block, and
wherein the processor is configured to transmit the new block to other communication nodes in the distributed communication network for verification before the new block is added to the blockchain, and
wherein a verification of a new block comprises a hash comparison of the second hash-value with a reference hash-value of all previous blocks of a local copy of the blockchain ledger stored in the memory of a communication node used for verification of the new block.

4. The communication node according to claim 3, wherein the processor is configured to add the new block to the local copy of the blockchain ledger stored in the memory only in case the communication node receives a positive verification for the new block from a number of trusted communication nodes in the distributed communication network.

5. The communication node according to claim 3, wherein the processor is configured to discard information to be added to the local copy of the blockchain ledger stored in the memory, in case the hash comparison of the second hash-value of all previous blocks written in the header of the block transmitted from the sender communication node with the reference hash-value of all previous block of the local copy of the blockchain ledger stored in the memory of the communication node is false.

6. The communication node according to claim 3, wherein the processor is configured to exclude a sender communication node from the distributed communication network for further communication with the communication node in case the hash comparison of the second hash-value of all previous block written in the header of the block transmitted from the sender communication node with the reference hash-value of all previous blocks of the local copy of the blockchain ledger stored in the memory of the communication node is false.

7. The communication node according to claim 3,
wherein the first hash-value of the new block and/or the second hash-value of all previous blocks of the local copy of the blockchain ledger is calculated using one or more of the following hash-functions: Public Key Infrastructure (PKI), Merkle Tree, nonce, SHA-256, and other common blockchain and cryptographic techniques.

8. The communication node according to claim 4,
wherein the processor is configured to recognize a candidate communication node of the distributed communication network as a trusted communication node in case the candidate communication node transmits a cryptographic key to the communication node that matches a cryptographic key stored in the memory of the communication node.

9. The communication node according to claim 8,
wherein the processor is configured to verify a key exchange of the cryptographic key transmitted by the candidate communication node and the cryptographic key stored in the memory of the communication node only when a user provides an authorization command.

10. The communication node according to claim 4,
wherein the trusted communication node is a line replaceable unit (LRU) or a sensor for an aircraft.

11. The communication node according to claim 6,
wherein the processor is configured to transmit a message to all other communication nodes of the distributed communication network comprising a command that configures the other communication nodes to exclude the sender node from the distributed communication network, in case the hash comparison of the second hash-value from all previous blocks written in the header of the block transmitted from the sender communication node with the reference hash-value of all previous blocks of the local copy of the blockchain ledger stored in the memory of the communication node is false.

12. A distributed communication network, the distributed communication network comprising:
a plurality of communication nodes,
wherein each communication node of the plurality of communication nodes comprises:
a communication module;
a memory; and
a processor;
wherein the communication module of each communication node is configured to communicate with a communication module of another communication node of the plurality of communication nodes in the distributed communication network,
wherein a local copy of a blockchain ledger of a permissioned blockchain is stored in the memory of each communication node,
wherein the processor of each communication node is configured to generate a record to be added to the local copy of the blockchain ledger stored in its memory every time the communication node sends or receives a message to any of the plurality of communication nodes in the distributed communication network, and
wherein the processor of each communication node of the distributed communication network is configured to verify and monitor the permissioned blockchain by consensus computing and previous hash comparisons.

13. The distributed communication network according to claim 12,
wherein the distributed communication network comprises a trusted communication node,
wherein the trusted communication node comprises:
a communication module;
a processor; and
a memory;
wherein the processor of the trusted communication module is configured to verify a block of a blockchain transmitted to the trusted communication node by comparing a hash-value of a previous block written in a header of the block with a hash-value of the previous block of a local copy of a blockchain ledger stored in the memory of the trusted communication node.

14. The distributed communication network according to claim 12,
wherein the processor of each communication node is configured to exclude a sender communication node from the distributed communication network for further communication with the communication node in case a hash comparison of a hash-value from a previous block written in the header of a block transmitted from the sender communication node with a hash-value of the previous block of the local copy of the blockchain ledger stored in the memory of the communication node is false.

15. The distributed communication network according to claim 12,
wherein the distributed communication network comprises a number of trusted communication nodes,
wherein a trusted communication node is configured to verify a candidate communication node based on a cryptographic key transmitted by the candidate communication node and a cryptographic key stored in a memory of the trusted communication node, and
wherein the trusted communication nodes are configured to validate the new communication node only in case a user provides an authorization command.

16. The distributed communication network according to claim 12,
wherein the distributed communication network is a communication network of an aircraft.

17. The distributed communication network according to claim 15,
wherein the trusted communication node is a line replaceable unit (LRU) or a sensor for an aircraft.

18. A method for monitoring communication and cybersecurity in a communication network, the method comprising the following steps:
storing, by a processor of a communication node of the distributed communication network, a local copy of a blockchain ledger of a permissioned blockchain in a memory of the communication node,
generating, by the processor, a record to be added to the local copy of the blockchain ledger stored in the memory every time the communication node communicates with any of a plurality of communication nodes in the distributed communication network, and
verifying and monitoring, by the processor, the permissioned blockchain by consensus computing and previous hash comparisons.

19. The method according to claim 18,
wherein the method further comprises:
verifying, by the processor of the communication node, a block of the blockchain transmitted to the communication node by comparing a hash-value of a previous block of the blockchain written in a header of the block with a hash-value of the previous block of a local copy of a blockchain ledger stored in the memory of the communication node.

20. The method according to claim 19, wherein the method further comprises:

excluding, by the processor of the communication node, a sender communication node from the distributed communication network for further communication with the communication node in case a hash comparison of a hash-value from a previous block written in the header of a block transmitted from the sender communication node with a hash-value of the previous block of the local copy of the blockchain ledger stored in the memory of the communication node is false.

* * * * *